(12) United States Patent
Guest

(10) Patent No.: US 6,957,833 B2
(45) Date of Patent: *Oct. 25, 2005

(54) TUBE COUPLINGS

(75) Inventor: John Derek Guest, Maidenhead (GB)

(73) Assignee: John Guest International Limited, Middlesex (GB)

( * ) Notice: Subject to any disclaimer, the term of this patent is extended or adjusted under 35 U.S.C. 154(b) by 57 days.

This patent is subject to a terminal disclaimer.

(21) Appl. No.: 10/420,209

(22) Filed: Apr. 22, 2003

(65) Prior Publication Data

US 2003/0201643 A1    Oct. 30, 2003

(30) Foreign Application Priority Data

Apr. 30, 2002 (GB) .................................... 0209899

(51) Int. Cl.⁷ ............................................... F16L 21/06
(52) U.S. Cl. ........................ 285/322; 285/323; 285/39; 285/376
(58) Field of Search ............................... 285/308, 310, 285/315, 85, 86, 322, 362, 361, 323, 39, 285/243

(56) References Cited

U.S. PATENT DOCUMENTS

| | | | |
|---|---|---|---|
| 2,452,277 A | 10/1948 | Woodling | |
| 2,475,741 A * | 7/1949 | Goeller | ..................... 285/382.7 |
| 2,640,716 A | 6/1953 | Bigelow | |
| 2,728,895 A | 12/1955 | Quackenbush et al. | |
| 2,953,398 A | 9/1960 | Haugen et al. | |
| 3,107,108 A | 10/1963 | Greene | |
| 3,180,664 A | 4/1965 | Franck | |
| 3,233,924 A | 2/1966 | Stanley et al. | |
| 3,250,550 A | 5/1966 | Lyon | |
| 3,334,661 A * | 8/1967 | Milette | ....................... 285/362 |
| 3,380,765 A | 4/1968 | Himmel | |
| 3,454,290 A | 7/1969 | Tairraz | |
| 3,552,781 A | 1/1971 | Helland | |
| 3,679,241 A | 7/1972 | Hoffman | |
| 3,747,964 A | 7/1973 | Nilsen, Jr. | |
| 3,834,742 A | 9/1974 | McPhillips | |
| 3,909,046 A | 9/1975 | Legris | |
| 3,989,283 A | 11/1976 | Pepper | |
| 4,005,883 A | 2/1977 | Guest | |
| 4,025,093 A | 5/1977 | Leczycki | |
| 4,062,572 A * | 12/1977 | Davis | ....................... 285/382.7 |
| 4,136,897 A | 1/1979 | Haluch | |

(Continued)

FOREIGN PATENT DOCUMENTS

EP    0 945 662 A2    9/1999

(Continued)

Primary Examiner—Daniel P. Stodola
Assistant Examiner—Aaron Dunwoody
(74) Attorney, Agent, or Firm—Workman Nydegger

(57) ABSTRACT

A tube coupling includes a coupling body having a throughway open at one end to receive an end portion of a tube. A seal encircles the throughway to seal with the outer face and end of the tube. A cap mounted on the body has a tube locking device to engage and hold the tube in the coupling body. The cap and body have interengaging structure which guide the cap on the body for rotation and simultaneous axial movement between a first position on the coupling body and a second position further along the body. As such, when the cap is in the first position the tube can be inserted through the cap into the seal in the throughway and held therein by the locking device and on rotating the cap into the second position, the tube held by the locking device is forced against the seal in the throughway.

22 Claims, 2 Drawing Sheets

U.S. PATENT DOCUMENTS

| | | |
|---|---|---|
| 4,188,051 A | 2/1980 | Burge |
| 4,253,686 A | 3/1981 | Aitken et al. |
| 4,298,222 A | 11/1981 | Davies |
| 4,305,606 A | 12/1981 | Legris |
| 4,309,050 A | 1/1982 | Legris |
| 4,335,908 A | 6/1982 | Burge |
| 4,613,158 A | 9/1986 | Ekman |
| 4,637,636 A | 1/1987 | Guest |
| 4,655,159 A | 4/1987 | McMills |
| 4,867,489 A | 9/1989 | Patel |
| 4,993,755 A | 2/1991 | Johnston |
| 5,056,829 A | 10/1991 | Kramer |
| 5,121,949 A | 6/1992 | Reese |
| 5,150,924 A | 9/1992 | Yokomatsu et al. |
| 5,181,751 A | 1/1993 | Kitamura |
| 5,217,261 A | 6/1993 | DeWitt et al. |
| 5,362,110 A | 11/1994 | Bynum |
| 5,388,866 A | 2/1995 | Schlosser |
| 5,466,019 A | 11/1995 | Komolrochanaporn |
| 5,593,186 A | 1/1997 | Harris |
| 5,607,190 A | 3/1997 | Exandier et al. |
| 5,957,509 A | 9/1999 | Komolrochanaporn |
| 6,056,326 A * | 5/2000 | Guest .................. 285/322 |
| 6,095,572 A | 8/2000 | Ford et al. |
| 6,193,239 B1 | 2/2001 | Fukano et al. |
| 6,293,595 B1 | 9/2001 | Marc et al. |
| 2002/0109353 A1 | 8/2002 | Guest |
| 2003/0006610 A1 | 1/2003 | Werth |
| 2003/0085568 A1 * | 5/2003 | Guest .................. 285/321 |

FOREIGN PATENT DOCUMENTS

| | | |
|---|---|---|
| EP | 1 087 168 A1 | 3/2001 |
| EP | 1 233 225 A1 | 8/2002 |
| EP | 1 359 362 A1 | 4/2003 |
| EP | 1 359 363 A2 | 4/2003 |
| EP | 1 310 720 A2 | 5/2003 |
| FR | 2 227 483 | 11/1974 |
| FR | 2 394 736 | 1/1979 |
| FR | 2 689 205 | 10/1993 |
| GB | 1 520 742 | 8/1978 |
| GB | 2 167 147 A | 5/1986 |
| WO | WO 95/28593 | 10/1995 |

* cited by examiner

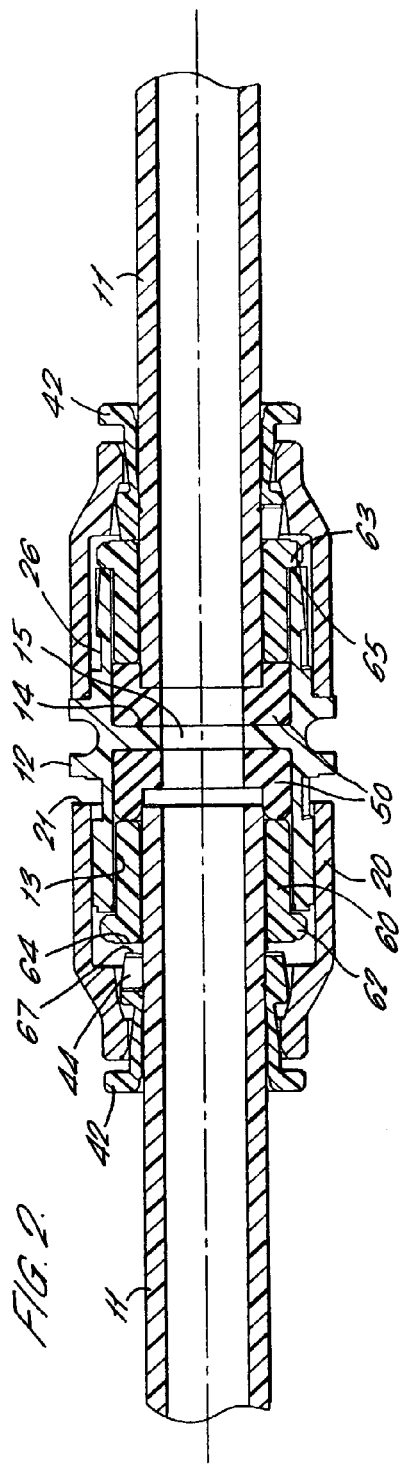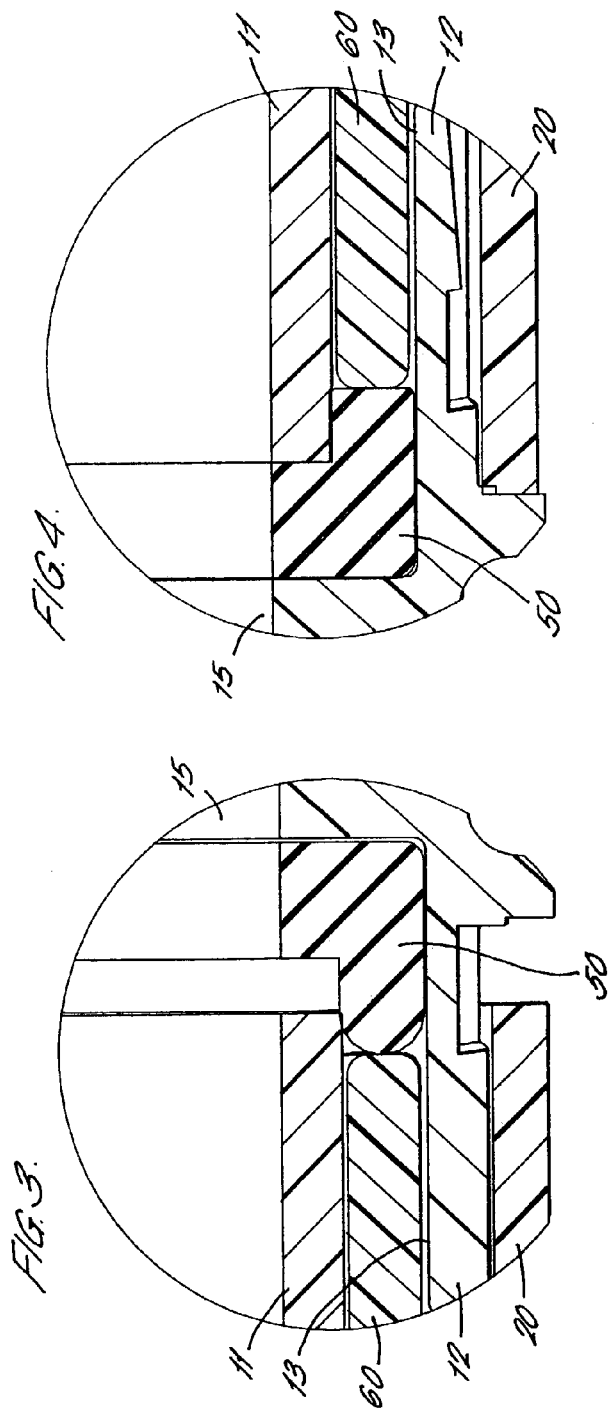

TUBE COUPLINGS

BACKGROUND TO THE INVENTION

1. Field of the Invention

The invention relates to tube couplings. It is an object of the invention to provide a coupling with enhanced sealing for the tube without voids between the tube and coupling surfaces in which fluids may be trapped and fester.

2. Background of Prior Art

EP-A-1233225 discloses a tube coupling to receive and hold a tube comprising a coupling body having a throughway open at one end to receive a tube. An annular step is formed in the throughway facing the open end to receive an end of a tube. An end cap is screwed on to the coupling body for axial movement between forward and retracted position on the coupling body, the end cap having an opening for the tube to extend through. A seal is located in the coupling body between the step and the open end of the body. The seal has an annular sleeve encircling the throughway and an outturned annular flange at one end lying against the annular step to receive and seal with an end of the tube inserted into the throughway. A compression device in the throughway is operable to compress the sleeve around the outer surface of the tube adjacent said end of the tube as the end cap is screwed on to the coupling body into the forward position.

SUMMARY OF THE INVENTION

This invention provides a tube coupling comprising a coupling body having a throughway open at one end to receive an end portion of a tube, a sealing means encircling the throughway to seal with the outer face and end of the tube and a cap mounted on the body having a tube locking device to engage and hold the tube in the coupling body, the cap and body having interengaging means which guide the cap on the body for rotation and simultaneous axial movement between a first position on the coupling body and a second position further along the body such that when the cap is in the first position it can be inserted through the cap into the seal in the throughway and held therein by the locking device and on rotating the cap into the second position, the tube held by the locking device is forced against the seal in the throughway.

The interengaging means may further include means to guide the cap on to the coupling body in an axial direction to the first position and means to resist disengagement of the cap from the coupling body.

Moreover the interengaging means may be further arranged to hold the cap in the second position.

In any of the above arrangements the interengaging means may be arranged to provide a partial turn of the cap between the first and second positions.

More specifically the partial turn of the cap may be approximately one quarter turn.

Also in any of the above arrangements the interengagement means between the cap and the body may comprise one or more projections formed on the inner side of the cap and one or more corresponding grooves in the outer side of the body extending from the end thereof to receive the projections and having detent means spaced from the end of the body past which the abutments in the cap snap to retain the cap on the body to define said first position of the cap, the grooves extending spirally around the body from the detent means for rotation of the cap with respect to the body and to draw the cap further along the body and means at the end of the spirally wound grooves to retain the projection at the ends thereof to define the second position of the cap in the positions in which the tube in the cap is pressed against the seal in the throughway.

In the latter case the spirally wound grooves may terminate adjacent an annular shoulder formed on the coupling body and the grooves extend parallel to the shoulder for a short distance to receive and retain the abutments at the end of their travel along the slots thereby defining the second position of the cap.

Preferably two slots are formed of diametrically opposite the locations on the outside of the coupling body and two abutments are formed diametrically opposite locations of the inside of the cap to engage in the slots.

The coupling body may have an annular step formed around the throughway to restrict movement of a tube into a throughway and the annular seal may be located in the throughway against the step.

In the latter case the annular seal may comprise an outer sleeve encircling the throughway to receive the outer periphery of the tube and an integral inner sleeve located within the outer sleeve adjacent the end with which the end of a tube is engageable.

In any of the above arrangements the locking device for securing the tube in the cap may comprise an annular collet having resilient fingers for engaging and gripping a tube and the cap has a tapered cam surface reducing towards the end of the cap remote from the coupling body with which the fingers of the collet are engageable to be pressed inwardly into engagement with the tube extending through the collet with a slight movement of the collet outwardly of the cap to grip and hold the tube in the cap.

BRIEF DESCRIPTION OF THE DRAWINGS

The following is a description of a specific embodiment of the invention, reference being made to the accompanying drawings in which:

FIG. 2 is a cross-sectional view through the coupling of FIG. 1 with the components of the coupling fully assembled with tubes, one tube being located in an initial engagement position and the other being fully engaged;

FIG. 3 is an enlarged view of part of the coupling of FIG. 2 showing said one tube in the initially engaged position; and FIG. 4 is a similar view to FIG. 3 showing the other tube in the fully engaged position.

DESCRIPTION OF THE PREFERRED EMBODIMENTS

Figure 1:
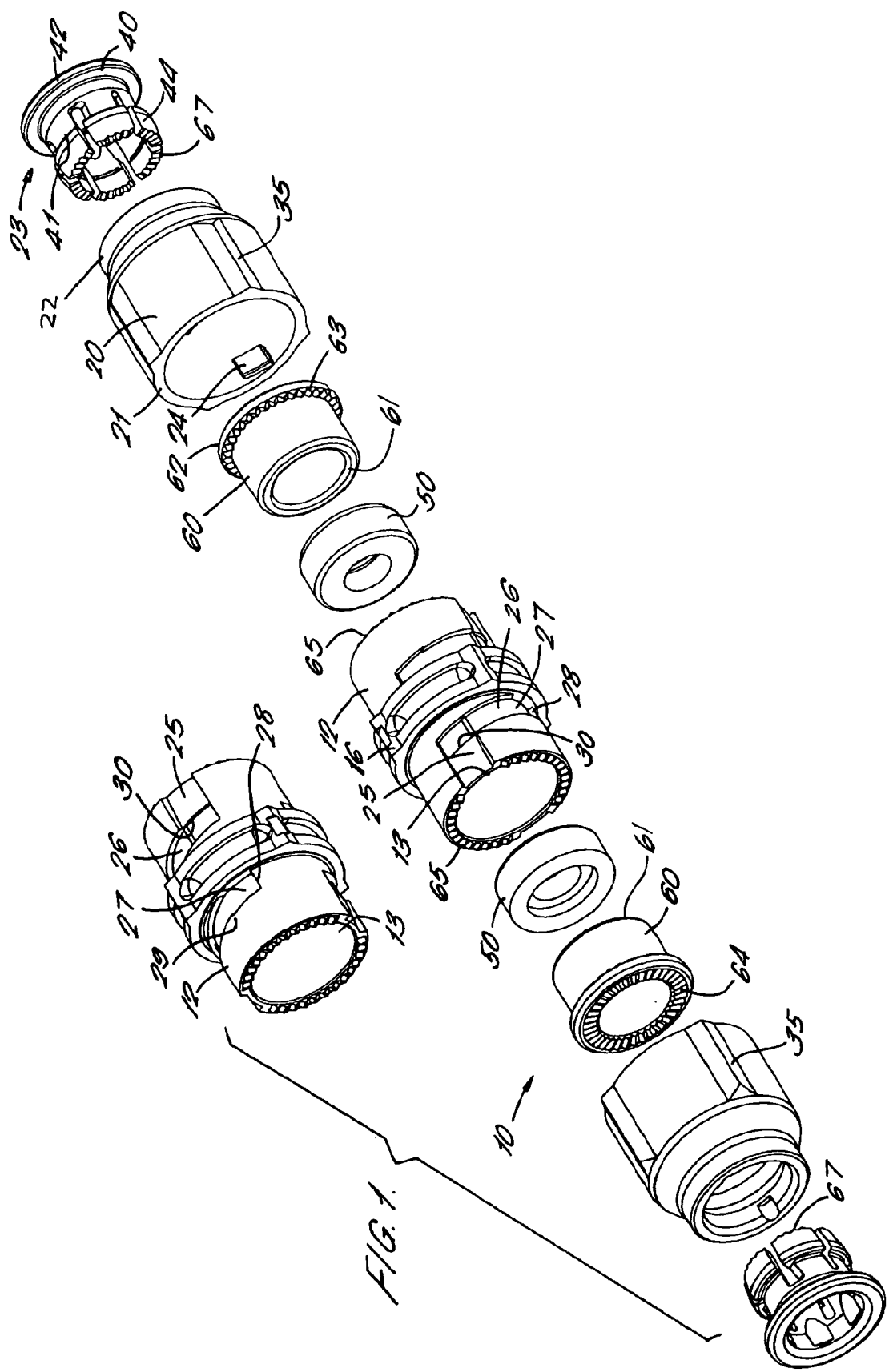
FIG. 1 is a exploded view of an inline tube coupling having identical tube connectors at each end thereof.

Referring firstly to FIG. 1 of the drawing, there is shown a double ended inline tube coupling indicated generally at 10 for connecting together two inline tubes indicated at 11 in FIG. 2.

The coupling comprises a central cylindrical coupling body 12 having a throughway 13 and an integral annular internal wall 14 located centrally in the throughway with a central aperture 15 for flow of fluid from tube to tube through the coupling.

The outer side of the coupling body has an encircling outer wall 16 formed integrally with the coupling body centrally along the body. The periphery of the outer wall is formed with four equally spaced abutments extending across the outer periphery of the wall and between the abutments the wall has shallow recesses. The raised abutments provide finger grips to enable the coupling body to be held against rotation during assembly and disassembly of tubes with the coupling as described later.

End caps 20 are engageable over the portions of the coupling body to either side of the central wall. The end caps are generally of cylindrical form having an open end 21 to receive an end portion of the cylindrical body 12 and having a reduced diameter socket 22 at the other end in which a collet 23 is engageable to receive and lock a tube in the end cap as describe later.

The open end 21 of the end cap has two shallow abutments 24 formed integrally with the wall of the end cap at diametrically spaced locations across the end cap. Each end portion of the cylindrical body 12 has in its outer surface axially extending grooves 25 formed at diametrically spaced locations around the coupling body leading towards the central wall 16. The grooves are dimensioned to receive the abutments 24 on the inner surface of the cap with a close fit and to guide the cap axially onto the coupling body.

Near to the central wall 16 the grooves 25 lead into helically wound grooves 26 extending a short distance of approximately one quarter of the circumference around the cylindrical body. The grooves 26 are dimensioned to receive the abutments 24 in the cap to allow the cap to rotate and at the same time to advance axially with respect to the coupling body. The grooves 26 run out at the wall 16 in a short end section 27 parallel to the wall which terminates with an end stop 28 at the end of the groove. The side of each groove remote from the wall is formed with a shallow projection 29 where the groove changes from the helical portion 26 to the end section 27 to retain the abutment 24 in the parallel section of the groove adjacent the end.

The axial portion of the groove 25 has a shallow ramp 30 over which the abutment 24 rides immediately before entering the helically groove section 26. The ramps serve to define a first position of assembly of the cap 20 on the coupling body and to retain the cap on the coupling body.

Thus in assembling the cap 20 on the coupling body, the cap is initially moved axially onto the coupling body with the abutments 24 sliding along the groove 25 and snapping over the ramps 30. Once the abutments have passed the ramps 30, the cap is then rotated moving the abutments along the helical grooves 26 until they engage in the straight section 27 where they are retained against the end stops 28 by the projections 29. The arrangement of grooves on the coupling body and abutments in the cap define a first position of location of the cap on the coupling body in which the abutments 24 in the cap have just snapped past the ramps 30 in the grooves 25 and a second position in which the cap is rotated through a quarter turn on the coupling body to bring the abutments 24 into engagement with the end stops 28 where they are retained by the projections 29. To assist in rotating the cap with respect to the coupling body, the cap has a plurality of axially extending ribs 35 at spaced locations around its outer surface.

As indicated earlier, each cap 20 has a reduced diameter socket 22 at the end remote from the coupling body in which the collet 23 is located to receive and lock a tube in the cap. Each collet 23 comprises an annular portion 40 having a plurality of axially extending spaced resilient arms 41 projecting into the cap and an out turned head 42. The arms 41 have inturned teeth to engage and grip a surface of a tube passing through the collet and have heads 44 at the ends of the arms to engage in an internal tapered frusto-conical cam surface formed in the tapered portion of the cap between the main part and reduced diameter socket 22. Engagement of the heads of the arms with the cam surface causes the arms to be compressed inwardly with outward movement of the collet from the cap to press the teeth of the arms firmly into gripping engagement with the tube and thereby resist withdrawal of a tube from the coupling body.

An arrangement of seals is provided in the throughway 13 in the coupling body to one side of the inner annular wall 14 as follows. Adjacent each side of the wall there is an annular seal 50 having an outer sleeve which extends around the throughway and is dimensioned to receive the end of a tube to be sealed in the coupling body. The sleeve has a short inner sleeve formed integrally with the outer sleeve to receive an end face of the tube projecting into the outer sleeve and form a seal therewith. The sleeve 50 is lodged against and supported by the annular wall 14.

Next to the sleeve 50 there is a ring member 60 one end 61 which abuts the sleeve and the other end of which has an encircling flange 62 formed with spaced axially facing teeth 63 on respective sides thereof. The ring 60 projects into the open end of the coupling body 12 and the teeth 63 mesh with corresponding teeth 65 formed on the end face of the coupling body to prevent rotation of the ring with respect to the coupling body. Likewise the ends of the arms 41 of the collet are formed with teeth 67 which mesh with the teeth 64 on the flange 62 so that when the collet is in engagement with the flange, the cap can be rotated on the coupling body as described earlier without causing the collet 23 to rotate.

As best seen in the left hand part of the coupling of FIG. 2 and the enlarged view of FIG. 3, a tube is assembled in the coupling body with a cap 20 positioned in the first position defined above in which the abutments 24 in the cap are snapped over the ramps in the grooves 25 but the cap is not advanced further on the coupling body at that stage. The tube to be connected to the coupling body is aligned with the open end of the cap and is inserted through the collet 23 in the cap, through the ring 60, and into the seal 50 in the throughway. The collet automatically grips and retains the tube to prevent the tube from being withdrawn from the coupling body.

The cap 20 is then rotated through the helical path defined by the grooves 26 to the position shown in the right hand part of FIG. 2 and in FIG. 4 and in so doing is drawn axially along the coupling body. The tube held by the collet is forced further into the throughway in the coupling body and is pressed firmly into the seal with the end of the tube engaging the inner seal. Ultimately the abutments 24 in the cap reach the end portions of the groove and are retained by the shallow projections referred to earlier to hold the cap in the second position of movement with the end of the tube held firmly sealed at the end of the tube by the inner seal and around the outer surface of the tube by the outer seal and O-ring seal.

Because the cap 20 rotates independently of the collet and tube as describe earlier, the tube does not damage the seals in the coupling body as it is forced into full sealing engagement with the seals.

When it is required to detach a tube from the tube coupling, the cap is rotated in the opposite direction back to the first position in its movement at the ends of the axial portions of the groove. The corresponding axial movement of the tube with the cap slightly releases the engagement of the end of the tube in the seal and the collet 23 can then be depressed into the cap to release the gripping engagement of the collet arms with the tube and to allow the tube to be extracted from the coupling body/cap.

The arrangement at the other end of the cap is identical and like parts have been allotted the same reference numerals. It will be appreciated that the arrangement is equally applicable to single tube couplings, elbows, T-joints and any other form of a coupling where a tube is required to be connected to another tube or other device.

It will be appreciated that many modifications may be made to the above described embodiment without departing from the scope of the invention. For example, an annular spacer and an O-ring may be located next to the sleeve in the throughway to receive and encircle a tube extending into the coupling body. The ring member 60 then abuts the other side of the O-ring to provide an additional seal between the tube and coupling body.

What is claimed is:

1. A tube coupling comprising a coupling body having a throughway open at one end to receive an end portion of a tube, a seal encircling the throughway to seal with the outer face and end of the tube and a cap mounted on the body having a tube locking device to engage and hold the tube in the coupling body, the cap and body having interengaging means for guiding the cap on the body for rotation and simultaneous axial movement between a first position on the coupling body and a second position further along the body such that when the cap is in the first position the tube can be inserted through the cap into the seal in the throughway and held therein by the locking device and on rotating the cap into the second position, the tube held by the locking device is forced against the seal in the throughway, wherein the interengaging means between the cap and the body comprises one or more abutments formed on the inner side of the cap and one or more corresponding grooves in the outer side of the body extending from the end thereof to receive the abutments and having detent means spaced from the end of the body past which the abutments in the cap snap to retain the cap on the body to define said first position of the cap, the grooves extending spirally around the body from the detent means for rotation of the cap with respect to the body and to draw the cap further along the body and means are provided at the ends of the spirally wound grooves to retain the projections at the ends thereof and to define the second position of the cap in the positions in which the tube in the cap is pressed against the seal in the throughway.

2. A tube coupling as claimed in claim 1, wherein the interengaging means further includes means for guiding the cap on to the coupling body in an axial direction to the first position and means for resisting disengagement of the cap from the coupling body.

3. A tube coupling as claimed in claim 1, wherein the interengaging means are further arranged to hold the cap in the second position.

4. A tube coupling as claimed in claim 1, wherein the interengaging means is arranged to provide a partial turn of the cap between the first and second positions.

5. A tube coupling as claimed in claim 4, wherein the partial turn of the cap is approximately one quarter turn.

6. A tube coupling as claimed in claim 1, wherein the spirally wound grooves terminate adjacent an annular shoulder formed on the coupling body and the grooves extend parallel to the shoulder for a short distance to receive and retain the abutments at the end of their travel along grooves slots thereby defining the second position of the cap.

7. A tube connector as claimed in claim 1, wherein two slots are formed of diametrically opposite the locations on the outside of the coupling body and two abutments are formed diametrically opposite locations of the inside of the cap to engage in the slots.

8. A tube coupling as claimed in claim 1, wherein the coupling body has an annular step formed around the throughway thereof to restrict movement of a tube into the throughway and the annular seal is located in the throughway against the step.

9. A tube coupling as claimed in claim 8, wherein the annular seal comprises an outer sleeve encircling the throughway to receive the outer periphery of the tube and an integral inner sleeve located within the outer sleeve adjacent the end with which the end of a tube is engageable.

10. A tube coupling as claimed in claim 1, wherein the locking device for securing the tube in the cap comprises an annular collet having resilient fingers for engaging and gripping a tube and the cap has a tapered cam surface reducing towards the end of the cap remote from the coupling body with which the fingers of the collet are engageable to be pressed inwardly into engagement with the tube extending through the collet with a slight movement of the collet outwardly of the cap to grip and hold the tube in the cap.

11. A tube coupling as claimed in claim 1, wherein the seal is mounted on the coupling body such that a terminal end face of the tube biases against the seal when the cap is moved to the second position.

12. A tube coupling to receive and hold a tube, the tube coupling comprising:
a coupling body having an interior surface bounding a throughway that extends through a first end of the coupling body, the throughway being adapted to receive a first end of a tube that terminates at an end face, the first end of the coupling body terminating at an end face having teeth formed thereon;
an annular seal at least partially disposed within the coupling body;
an end cap engaging the coupling body for selective movement between a retracted position and a forward position on the coupling body;
a collet having a plurality of resilient arms, the collet being at least partially disposed within the tubular end cap such that when the end cap is in the retracted position, the first end of the tube can be advanced into the throughway of the coupling body by passing through the end cap and the collet and when the end cap is moved into the forward position, the end cap radially inwardly compresses the resiliently arms of the collet so that the collet engages the tube and forces the end face of the tube against the seal within the throughway; and
a ring member disposed between the collet and the seal and having a first end and an opposing second end, the ring member including a flange radially outwardly projecting at the second end of the ring member, the flange having an inside face and an opposing outside face, the inside face of the flange releasably interlocking with the end face of the coupling body when the end cap is in the forward position, teeth being formed on the inside face of the flange of the ring member, the teeth on the inside face of the flange releasably interlocking with the teeth on the coupling body.

13. A tube coupling as claimed in claim 12, wherein the first end of the ring member terminates at a first end face and the second end terminates at a second end face, the first end face of the ring member biasing against a terminal end face of the seal and the second end face or the ring member biasing against the collet.

14. A tube coupling as claimed in claim 12, wherein the second end of the ring member releasably interlocks with the collet such that the collet cannot rotate independent of the ring member when the end cap is in the forward position.

15. A tube coupling as claimed in claim 14, wherein the first end of the ring member abuts against the annular seal when the end cap is in the forward position.

16. A tube coupling as claimed in claim 14, wherein the collet has a first end with teeth formed thereon and the second end of the ring member has teeth formed thereon, the teeth on the collet releasably interlocking with the teeth on the ring member when the end cap is in the forward position.

17. A tube coupling as claimed in claim 12, further comprising teeth formed on the outside face of the flange of the ring member.

18. A tube coupling as claimed in claim 12, further comprising the end cap having a cam surface which tapers towards an open end of the end cap, the resilient arms of the collet being pressed radially inward by the cam surface when the end cap is in the forward position.

19. A tube coupling as claimed in claim 12, wherein at least one of the arms of the collet has an interior surface with a tooth formed thereon, the tooth engaging against the tube when the end cap is in the forward position.

20. A tube coupling as claimed in claim 12, wherein the collet biases the ring member against the seal when the end cap is moved from the retracted position to the forward position.

21. A tube coupling as claimed in claim 12, further comprising:
   the coupling body having an exterior surface with at least one helical grove formed thereon; and
   the end cap having an interior surface with an abutment projecting therefrom, the abutment engaging with the at least one helical grove of the coupling body.

22. A tube coupling as claimed in claim 12, wherein the annular seal has a substantially L-shaped transverse cross section.

* * * * *

UNITED STATES PATENT AND TRADEMARK OFFICE
CERTIFICATE OF CORRECTION

PATENT NO. : 6,957,833 B2 Page 1 of 1
DATED : October 25, 2005
INVENTOR(S) : John Derek Guest It is certified that error appears in the above-identified patent and that said Letters Patent is hereby corrected as shown below:

<u>Column 4,</u>
Line 15, after "member 60" insert -- , --.
Line 16, after "61" insert -- of --.

Signed and Sealed this

Twenty-fifth Day of April, 2006

JON W. DUDAS
*Director of the United States Patent and Trademark Office*